Oct. 1, 1963 H. W. TREVASKIS 3,105,788
TYRE BUILDING FORMERS OR DRUMS
Filed Dec. 9, 1959 2 Sheets-Sheet 1
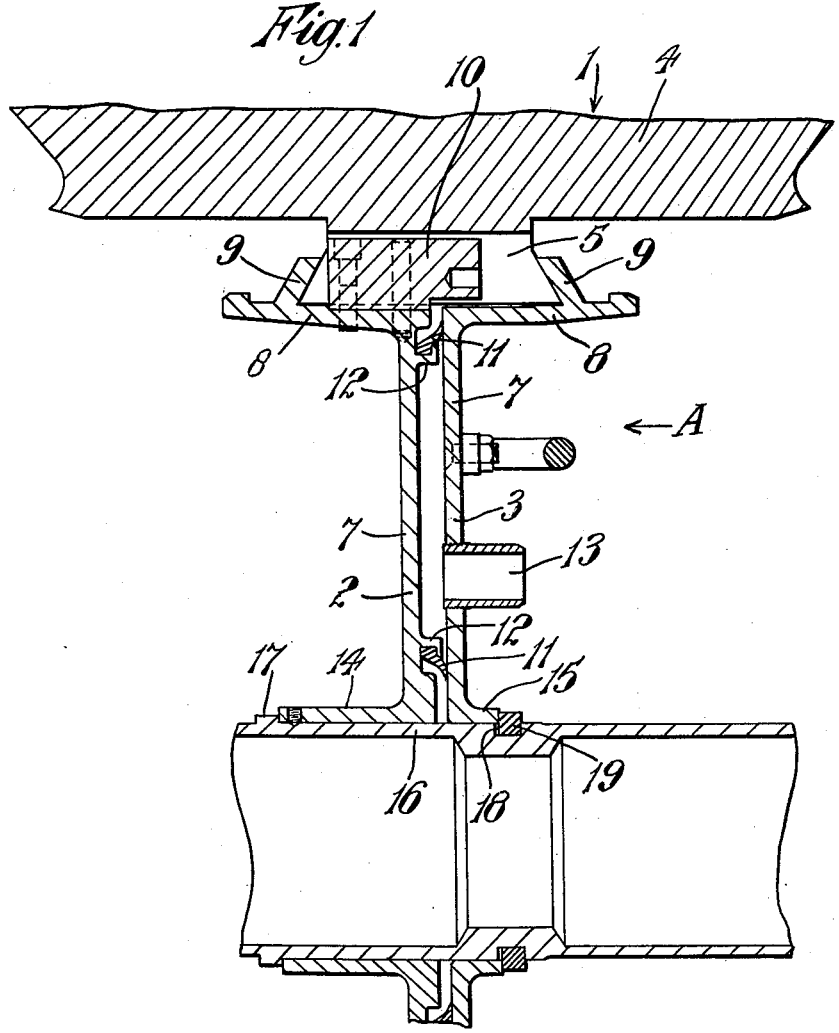
INVENTOR
Henry William Trevaskis
by Benj. T. Rauber
his attorney

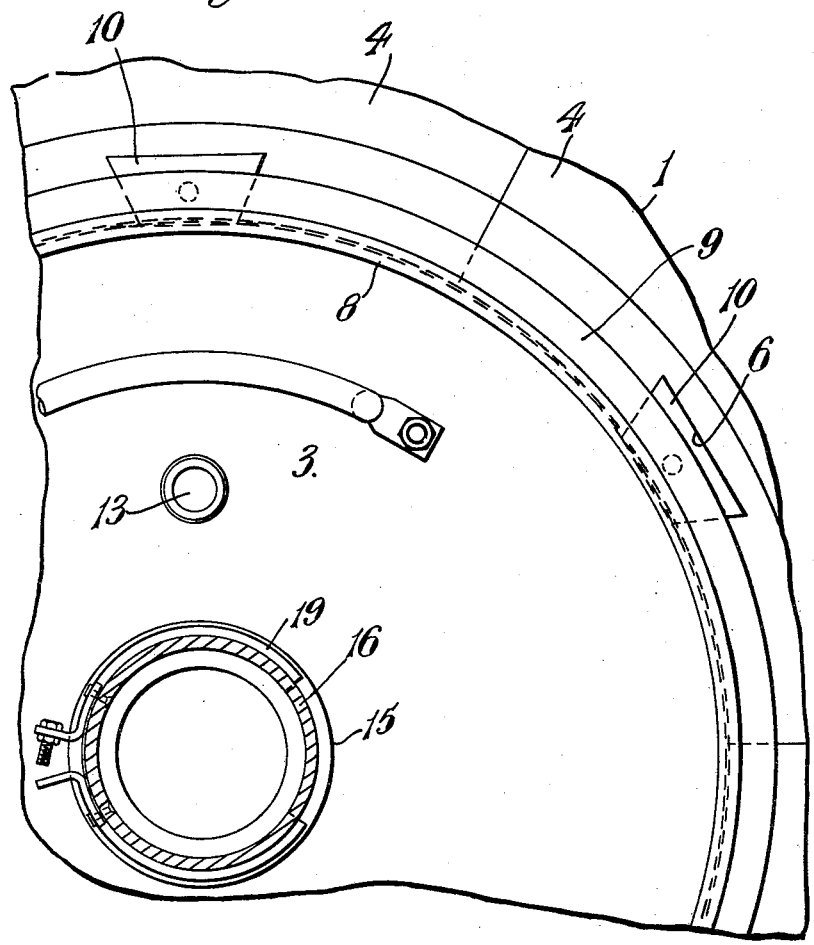

United States Patent Office 3,105,788
Patented Oct. 1, 1963

3,105,788
TYRE BUILDING FORMERS OR DRUMS
Henry William Trevaskis, Point Pleasant, Blackdown, near Leamington Spa, England, assignor to Dunlop Rubber Company Limited, a company of Great Britain
Filed Dec. 9, 1959, Ser. No. 858,398
Claims priority, application Great Britain Dec. 20, 1958
6 Claims. (Cl. 156—417)

This invention relates to tyre building formers or drums of the kind comprising a number of segments which together form the building surface and a central part including clamping means for engaging and holding them in assembled relation. The clamping means is usually operated by bolts or other screw devices so that the assembly and separation of the parts of the former or drum require the tightening or release of the screw devices which is an inconvenient and sometimes time-consuming operation.

According to the present invention a tyre building former or drum comprises a number of segments which together form the building surface and a central part including clamping means for engaging and holding them in assembled relation, the clamping means being designed for actuation by fluid pressure.

Preferably, the central part comprises two complementary members between which a vacuum or low pressure can be established so that the external atmospheric pressure holds them together.

One embodiment of the invention will now be described by way of example, with reference to the accompanying drawings in which:

FIG. 1 is a fragmentary axial cross section of apparatus for building tyres.

FIG. 2 is a side elevation viewed in the direction of arrow A of FIGURE 1.

As shown in FIGURE 1 the apparatus consists of an annular building former 1 and two central former mounting parts 2 and 3.

The building former 1 comprises six similar arcuate shaped segments 4 which can be assembled together to form an outer ring, the outside of which provides the tyre building surface. Each segment 4 has a radially inwardly extending portion 5 of dovetail cross-section, extending circumferentially as shown in FIG. 1 so that when the segments are assembled together these portions form an inwardly directed annular rib of the dovetail cross-section (see FIGURE 2), flaring axially outwardly from its junction with the main parts of the segments. Halfway along the inner circumferential surface of each of the segments 4 is cut an axially extending slot 6 of dovetail shape in cross section normal to its length, with the narrow part of the dovetail at the surface and the walls of the slot flaring radially outwardly away from the said surface, as shown in FIGURE 2.

The segments 4 when assembled surround the mounting parts 2 and 3, each of which comprises an annular disc portion 7 with an outer diameter such as to fit within the inner diameter of the annular rib. Around the periphery of and extending on one side of the disc 7 of each of the parts 2 and 3 is a cylindrical flange 8 of length slightly less than half the width of the widest part of the annular rib formed by the portions 5. A short annular flange 9 extends radially outwardly from the end of each of the flanges 8 remote from the disc 7, and is inclined towards the plane of the disc at an angle equal to that between the side walls and base of the dovetail-sectioned portions 5 of the former segments 4. The flanges 8 and 9 of the parts 2 and 3 thus combine to form, when the parts are placed together, an annular recess of dovetail section complementary to the rib formed by the assembled portions 5, and the parts 2 and 3 can be placed together, one from each side of the assembled segments 4, with their flanges 8 extending away from each other so that the flanges 9 will engage the sides of the rib and hold the segments in assembled relation.

Six equally spaced blocks 10 are secured around the periphery of the flange 8 of the part 2. Each block extends axially of the flange 8 and is of dovetail cross-section complementary to the slots 6 of the segments 4, and the blocks are positioned so as to correspond with the slots 6 when the part 2 is assembled with the segments as described above. These blocks facilitate assembly of the former by enabling the segments to be placed separately in position on the part 2 and retained by their slots 6 engaging the blocks until all the segments are in position and the part 3 can be applied to lock the assembly.

Two annular sealing rings 11 of rubber or other resilient flexible material of tapered cross-section are mounted on the radial face of the disc 7 of the part 2 which on assembly confronts the part 3, their bases being received in complementary channels defined by mounting rings 12 projecting from the said face, and their tapering portions extending axially away from the face. One of the sealing rings is mounted near the outer edge of the disc and extends somewhat radially outwardly, and the other sealing ring is mounted near to the inner edge of the disc and extends somewhat radially inwardly. A tubular connection 13 is provided in the flange 8 of the part 3 so that on assembly as shown in FIGURE 1 it lies between the sealing rings 11 of the part 2. Thus when the parts 2 and 3 are placed face to face as shown in FIGURE 1, the tapering ends of the seals 11 engage the confronting face of the part 3 and seal the space between them, and this space can be subjected to a vacuum or low pressure by means of the connection 13 and the external atmospheric pressure will urge the parts 2 and 3 close together to lock the whole assembly in position, with the flanges 9 tightly gripping the rib of the assembled segments.

The central part 2 has a central axial sleeve 14 extending from the same side of the disc 7 as the flange 8. A shorter central axial sleeve 15 extends similarly from the disc 7 of the part 3. Thus when the parts 2 and 3 are in their assembled condition the sleeves 14 and 15 extend axially away from each other. Each sleeve is of internal diameter such as to be a sliding fit on a shaft 16 for mounting the former. The shaft has a radially outwardly extending rib 17 to form an abutment for the end of sleeveg 14 for locating the former assembly in its desired position. An annular groove 18 is formed in the shaft in a position so that when the parts 2 and 3 are correctly assembled as shown in FIGURE 1 with the sleeve 14 in abutment with the rib 17, and the parts 2 and 3 are urged towards each other by external pressure as previously described to grip the rib of the assembled segments 4, the groove will be exposed sufficiently for a split, annular, radially expansible, spring 19 to be inserted in it to lock the whole assembly together. When the circlip is in position the vacuum or low pressure can be released, thus avoiding any inconvenience to tyre building operations.

The complete former 1 is assembled by sliding the segments 4 onto the respective blocks 10 around the part 2. The part 3 is applied on the other side of the segments so that the flanges extend away from the part 2 as described, and the shaft 16 is inserted through the aligned sleeves 14 and 15. The parts 2 and 3 are pushed towards each other by hand and, when the edges of the sealing rings 11 contact the disc 8 of the part 3 vacuum or low pressure is applied to the space between the parts by means of the connection 13 causing them to be moved towards each other until the flanges 10 grip the rib 6 of the assembled segments. This exposes the grooves 18 so that the spring 19 can be placed around it. The vacuum is released and the circlip holds the parts of the former in assembled relation. The former can then be used as desired for building a tyre and when the tyre building operation is completed a vacuum pipe is again applied to the connection 13 in the central part 3 so as to draw the parts 2 and 3 together sufficiently to free the circlip 19 and enable it to be removed. On release of the vacuum central parts 2 and 3 can be removed from the shaft and the segments can be removed from the built tyre and separated in the usual manner.

The invention thus provides a former, the parts of which can be clamped together and released by the simple operation of applying a vacuum pipe to a connection in one of the central parts. The operation saves valuable time in the production of tyres and is simpler to manipulate than previous screw devices serving the same purpose.

Having now described my invention, what I claim is:

1. A tyre former comprising a plurality of arcuately-shaped segments assembled together circumferentially end-to-end to form on their outer periphery a tyre building surface, each said segment having a radially inwardly extending portion of dove-tail section on a radially extending plane with a pair of axially spaced circumferentially extending surfaces flaring radially inwardly and axially away from each other to form a pair of recesses on opposite sides of said inwardly extending portion, a pair of mounting elements radially inwardly of said segments and movable axially toward each other and having clamping elements one on each side of said inwardly extending portion of said segments, said clamping elements having surfaces sloping complementarily to the flaring surfaces of said inwardly extending portions and positioned to engage said surfaces as said mounting elements are moved toward each other thereby to grip said segments on said mounting elements as said mounting elements move toward each other and to release said segments on reverse movement and means to move said mounting elements toward each other.

2. A former according to claim 1 comprising a shaft on which said clamping means are slidably mounted, an abutment on the shaft engaging the axially outer end of one of the two clamping members, said shaft having a groove at the axailly outer end of the other clamping member when the members are in their clamping position, and a split circular spring to engage the groove for locking the clamping members in clamping position.

3. The tyre building former of claim 1 in which said means to move said mounting elements axially to clamp said segments comprises means extending from one mounting element to the other to form an axially contractable fluidtight vacuum chamber.

4. The former of claim 3 in which the mounting elements comprise disc-shaped portions inwardly radially of said clamping members and in which said means extending from one mounting element to the other comprises an annular ring of resilient material between said disc-shaped portions to seal said contractable vacuum chamber.

5. The former of claim 4 in which said radially inwardly extending portions of each said segment extends circumferentially of said segment and forms an annular dove-tail rib within the assembled segments.

6. The former of claim 1 which comprises a supporting member for each said segment on at least one of said mounting elements to mount and support said segments on said mounting elements prior to clamping, said supporting member comprising a projection extending radially outwardly from one of said mounting elements, each said projection being of dove-tail section on a plane transverse to the axis of the former and in which each said segment has a complementary groove to receive one of said projections.

References Cited in the file of this patent

UNITED STATES PATENTS

| | | |
|---|---|---|
| 1,456,425 | De Mattia | May 22, 1923 |
| 1,690,541 | Kuzelewski | Nov. 6, 1928 |
| 1,717,437 | De Mattia | June 18, 1929 |
| 1,792,462 | Hudson | Feb. 10, 1931 |
| 1,923,705 | Campbell | Aug. 22, 1933 |
| 2,926,721 | Haase | Mar. 1, 1960 |